United States Patent [19]
Lejuene

[11] 3,850,222
[45] Nov. 26, 1974

[54] RECAPPING LARGE TIRES

[75] Inventor: Daniel Lejuene, Clermont-Ferrand, France

[73] Assignee: Compagnie Generale Des Etablissements Michelin raison sociale Michelin & Cie, Clermont-Ferrand (Puy-de-Dome), France

[22] Filed: July 25, 1972

[21] Appl. No.: 274,981

[30] Foreign Application Priority Data
Aug. 2, 1971    France .............................. 71.28339

[52] U.S. Cl. .................................... 157/13, 83/171
[51] Int. Cl. ........................................ B29h 21/08
[58] Field of Search ........ 157/13; 83/5, 171; 30/140

[56] References Cited
UNITED STATES PATENTS

| | | | |
|---|---|---|---|
| 2,362,967 | 11/1944 | Bivans.................................. | 157/13 |
| 3,352,011 | 11/1967 | Alexander et al. ................ | 81/171 X |
| 3,472,714 | 10/1969 | Ragan................................... | 156/96 |
| 3,487,868 | 1/1970 | Ragan.................................. | 152/209 |
| 3,491,651 | 1/1970 | Pascoe.............................. | 83/171 X |
| 3,623,531 | 11/1971 | Christie............................... | 157/13 |
| 3,641,855 | 2/1972 | Balle..................................... | 83/171 |
| 3,693,253 | 9/1972 | Jager et al. ........................... | 30/140 |
| 3,732,767 | 5/1973 | Habert.................................. | 83/171 |

*Primary Examiner*—Al Lawrence Smith
*Assistant Examiner*—Harold P. Smith, Jr.
*Attorney, Agent, or Firm*—Brumbaugh, Graves, Donohue & Raymond

[57] ABSTRACT

A tool for cutting grooves in a tire tread includes a transformer having a primary and a secondary and means for supplying the primary with current of low voltage at a frequency between 50 and 1,000 hertz, and preferably between 200 and 500 hertz. At least a portion of the secondary is formed as a blade having a shape corresponding to the profile of the grooves to be cut. Drive means including a hydrualic jack is provided for hauling the tool blade through the tread to cut the grooves. The tool facilitates recapping large tires.

8 Claims, 3 Drawing Figures

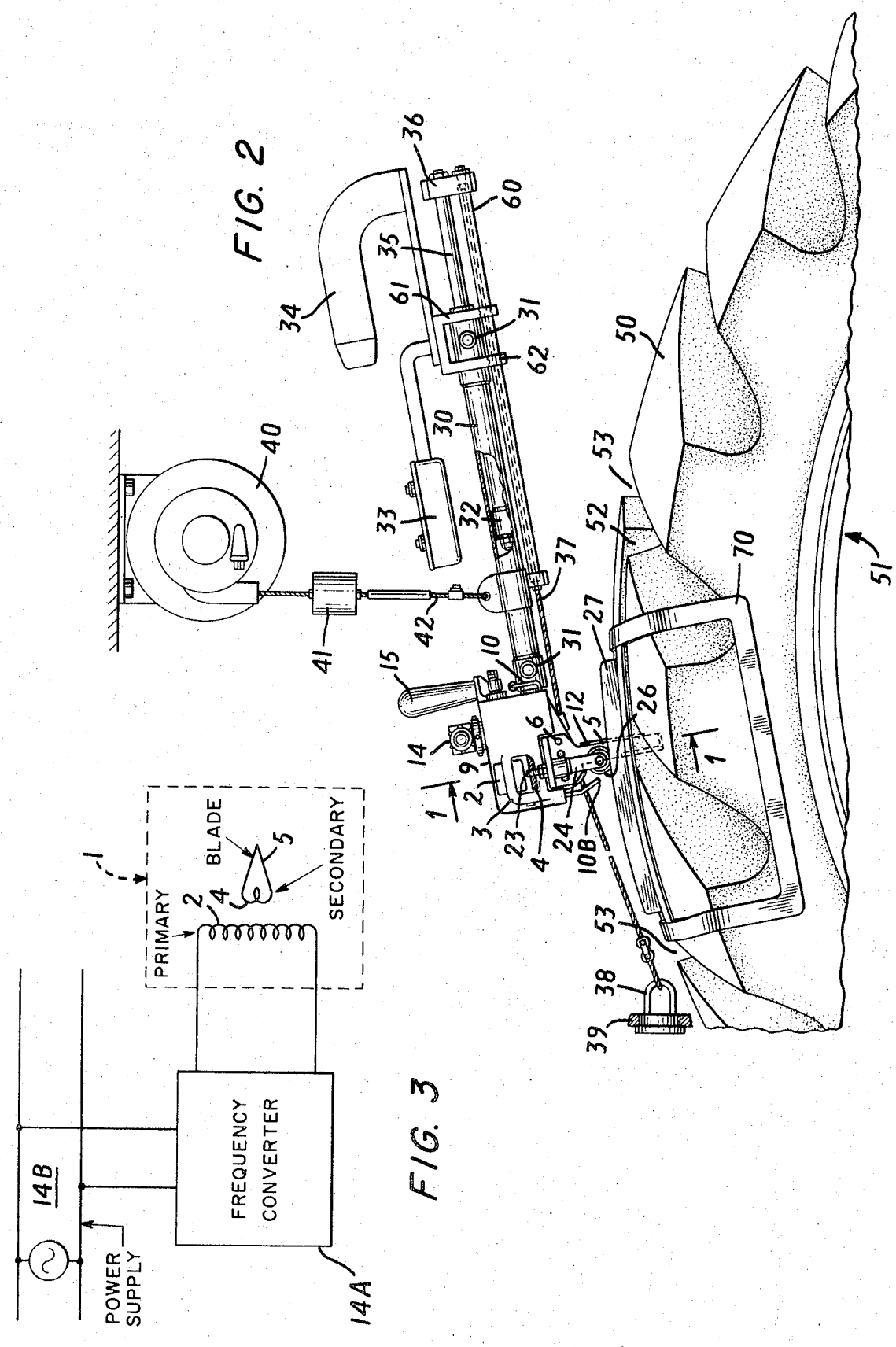

RECAPPING LARGE TIRES

BACKGROUND OF THE INVENTION

This invention relates to the recapping of tires and, more particularly, to a novel and highly-effective tool and method whereby tires of very large size, such as those employed on construction equipment, can be recapped simply and economically.

Various methods of recapping tires are known. One method involves applying to a previously-prepared carcass a strip of camelback and placing the entire unit in a mold in order to obtain an impression of the tread pattern and a vulcanization of the tread under the combined action of heat and pressure. This method requires cumbersome and heavy handling and curing equipment and can therefore only be practiced in the factory.

Another method involves applying to the previously-prepared casing cleats or bars of uncured rubber obtained by molding or extruding in suitable profiles. These cleats or bars are positioned manually.

The tire thus equipped is then placed in an autoclave in which the curing of the cleats or bars is effected by steam under pressure. This method requires only relatively light equipment, but the adherence of the cleats or bars constituting the tread leaves at times something to be desired and is far inferior to that of a continuous tread wound and pressed around the casing.

A third method which combines the advantages of the two methods described above could be contemplated. It would involve placing a continuous tread on the casing, carving the tread pattern into the tread by means of a suitable tool and in an autoclave, the forming of the tread pattern being preceded or previously followed by the autoclave curing. This method would have the advantages of good adherence of the tread to the casing in the recapped tire and the use of relatively light recapping equipment. Unfortunately there is no tool which makes it possible to cut a tread pattern in a vulcanized tread of a large tire with acceptable conditions of speed and efficiency. The power necessary to remove in a single pass or in a very few passes the rubber that occupies the grooves of the tread pattern moreover far exceeds the possibilities of a small hand tool.

SUMMARY OF THE PRESENT INVENTION

A primary object of the present invention is to provide a light tool that makes it possible manually to cut a tread pattern in vulcanized treads of large tires.

The foregoing and other objects are attained in accordance with the invention by the provision of a tool comprising a heated U-shaped blade having a shaped corresponding to the profile of the grooves to be cut. The tool is characterized in that the blade is part of a closed coil forming the secondary of a transformer whose primary is fed with low-voltage alternating current of a frequency of between 50 and 1,000 cycles, and preferably between 200 and 500 cycles.

The feature described above confers important advantages. In order to dig deep into vulcanized rubber there is required a heated metal blade of very high mechanical strength. Under these conditions it is not possible to heat the blade by means of a current of industrial type without providing supply lines that are incompatible with the lightness required for a hand tool. The invention on the other hand makes it possible to supply the tool with current of low voltage and moderate amperage while obtaining a current of low voltage and very high amperage in the blade. The supply of current having a frequency of about 250 cycles per second furthermore makes it possible considerably to reduce the weight of the transformer at the cost of using a converter supplied with current of industrial frequency (50 or 60 cycles per second depending on the country).

In accordance with the invention, the tool also comprises a drive member for its displacement. This drive member preferably comprises a hydraulic jack serving as tool handle and ensuring the advance of the tool by exerting a pull on a cable fastened at one end to the tool and at the other end to the frame serving as support for the tire. Furthermore, the tool is advantageously suspended by a cable from a device such as an equalizer, which compensates for the weight of the tool. The operator therefore need supply no other force than that necessary to orient the apparatus to cause it to follow along the desired path, which may be defined by a jig.

The process in accordance with the invention for the recapping of a large tire comprises in a first step winding a tread over a previously-prepared casing, in a second (or third) step curing in an autoclave, and in a third (or second) step the cutting of the tread pattern in the tread. The process is characterized in that the grooves of the tread pattern are cut in a very small number of passes by a cutting tool heated to a temperature of between 100° and 200°C and advancing at a speed of 0.2 to 2 meters per minute.

Preferably the grooves are cut in a single pass with a cutting speed close to 0.3 to 0.4 meters per minute and a cutting temperature close to 180°C. For a groove having a cross-section of close to about 25 cm$^2$, this means a force of the order of 400 to 500 kg.

BRIEF DESCRIPTION OF THE DRAWING

An understanding of other aspects of the invention can be gained from a consideration of the following detailed description of the preferred embodiments thereof, in conjunction with the appended figures of the drawings, wherein:

FIG. 2 is a view in side elevation and partly in section, of the tool of FIG. 1 with its drive member and the supporting and pulling cables, during the course of its use; and FIG. 3 is a schematic diagram of an electrical circuit in accordance with the invention.

DESCRIPTION OF THE PREFERRED EMBODIMENTS

Figure 1:
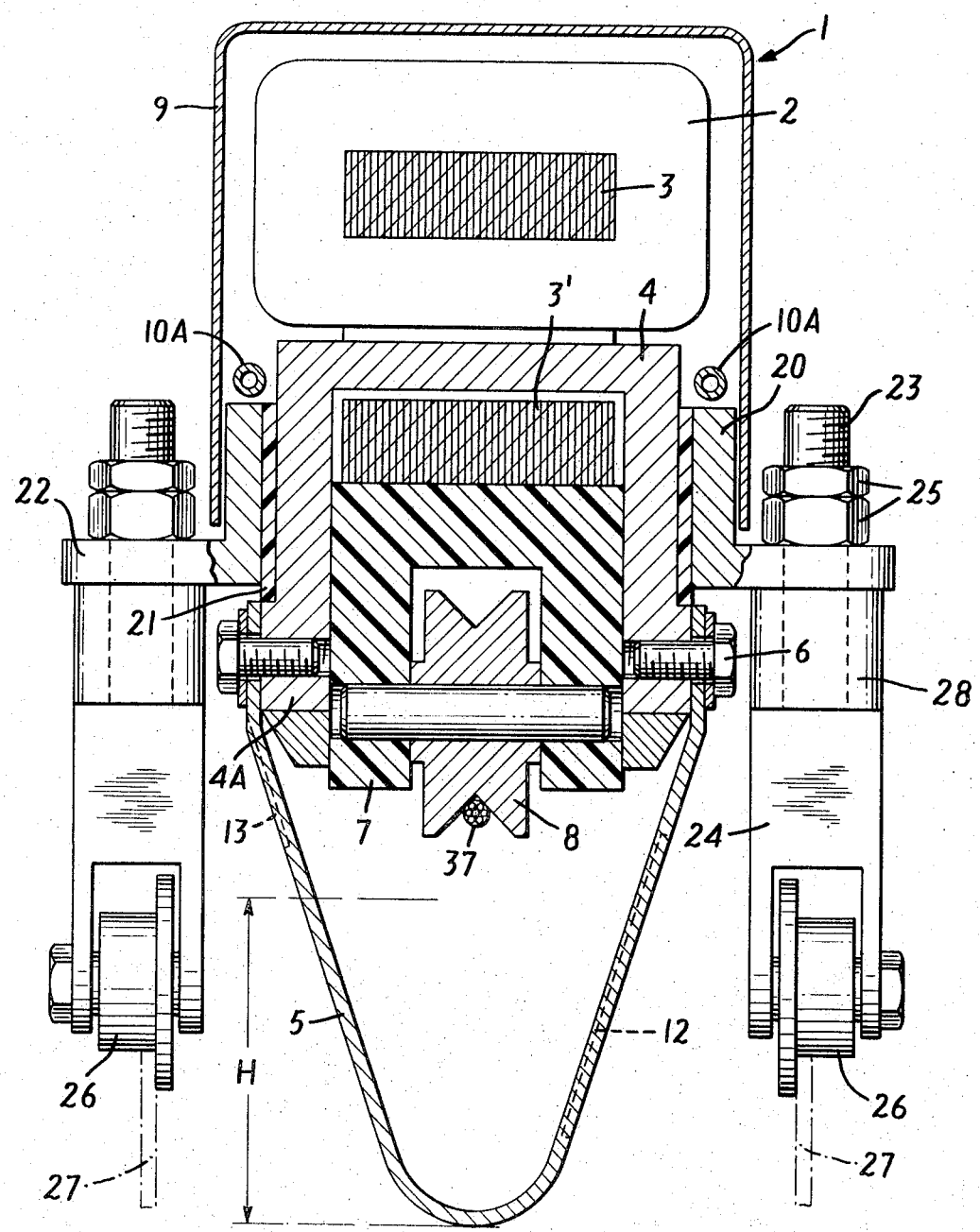
FIG. 1 is a view in cross-section of a tread-cutting tool in accordance with the invention, the view being at the level of the heating blade and taken along the line 1—1 of FIG. 2.

The cutting tool 1 shown in FIG. 1 comprises a transformer having a primary winding 2, a core 3, and a secondary winding comprising a piece of copper 4 having the cross-section of an inverted U. The secondary has a core 3'. A steel blade 5 is bent into the shape of a V or U the ends of which are removably fastened by screws 6 to the lower part of each of the legs 4A of the piece of copper 4. In the space between the legs 4A of the piece of copper 4 there is an insulating element 7 having the cross-section of an inverted U. The insulating element 7 serves as support for a grooved roller 8 the axis of rotation of which is parallel to the base of the element 7 and the plane of rotation of which is equally spaced from each of the ends of the blade 5 which are fastened to the piece of copper 4.

The primary winding 2 of the transformer is connected by a connecting box 14 (FIG. 2) to a source 14A (FIG. 3) of alternating current of low voltage (for example 110 V), of a frequency of 400 cycles per second. The source 14A may be a frequency converted connected in turn to a power supply 14B that supplies power at a frequency of 50 or 60 hertz, depending on the country. The winding 2 is protected by a hood 9 on which the connecting box 14 is fastened. On this hood there is also fastened a handle 15 intended to permit the operator to maintain the tool at the work depth established.

The blade 5, which constitutes a part of the secondary of the transformer, comprises a cutting zone the maximum height H of which is substantially equal to half the height of the blade, the other half constituting the region for the fastening of the blade to the piece 4. In order to concentrate the thermal energy within the cutting zone, the latter has, seen laterally (FIG. 2), a width which is definitely less than the width of the fastening zone so that the heating of the cutting zone due to the passage of electric current is greater than the heating of the fastening zone.

The piece of copper 4 and the cutting zone are cooled by a cooling fluid, for instance compressed air, fed, for instance, by a compressor via a pipeline 10 (FIG. 2) discharging on the other hand at 10A (FIG. 1) in the hood 9 near and on each side of the piece of copper 4, and on the other hand at 10B (FIG. 2) upstream of the blade 5.

Lest the temperature of the cutting part exceed a predetermined maximum value, the tool comprises a thermometer probe 12 incorporated in the blade 5 at the rear of its cutting edge. This probe is connected to a thermal switch (not shown), known per se, which interrupts the supply of current to the transformer when the predetermined maximum temperature is reached and reestablishes the current as soon as the temperature measured is less than the value fixed. Another probe 13 is provided in the part of the blade located above the cutting zone. This probe cooperates with another thermal switch (not shown) controlling the flow of cooling fluid.

The tool 1 is supported in a frame 20 that surrounds the piece of copper 4 with the interposition of an insulator 21. The frame 20 comprises two lateral lugs 22 each drilled with a bore hole that is transversed by a threaded rod 23 the vertical position of which is fixed by an assembly 25 comprising a nut and a lock nut. These rods 23 extend in the vertical direction of the blade 5 and each terminates in a guide roller 26 the axis of rotation of which is perpendicular to the longitudinal axis of each rod 23. These two rollers are intended to rest and roll on two runways or rails such as 27 placed on the tire tread 50 from which grooves such as 52 (FIG. 2) are to be cut by means of the tool 1. By means of the threaded rods 23, the nuts 25 and a spacer 28, it is possible to adjust the depth of penetration of the blade 5 into the tread 50.

In accordance with the invention, drive means is provided to haul the tool to enable the blade 5 to cut grooves in the tire tread. The tool 1 is fastened to the end of the cylinder 30 of a hydraulic jack (FIG. 2) known per se, provided with two connections 31 that can both serve either as inlet or as outlet for fluid under pressure. In order to operate the jack, these fluid inlets and outlets are controlled from a box 33 with four pushbuttons which is fastened on the jack cylinder 30. A handle 34 is provided to facilitate the handling of the tool assembly. Two of the pushbuttons of the box 33 are connected electrically to a pressure-fluid distributor (not shown) which controls the movements of the cylinder 30 and therefore the displacements of the tool 1. The other two pushbuttons of the box 33 serve to control the rotation of the tire 51 mounted with horizontal axis on a support, not shown.

The cylinder 30, which constitutes a first part of the jack and which is connected to and movable with the tool, carries a piston 32, which constitutes a second part of the jack, the two parts being movable with respect to each other. At its end opposite the piston 32 the rod 35 of the piston bears a device 36 for fastening one end of a cable 37 the other end of which is provided with a hook by means of which the cable can be fastened to a yoke 38 constituting a fixed point such as 39 located in the extension of the groove 52 which is to be cut in the tread 50. It is advisable to provide near the tire a large number of fastening points such as 39 for the cable so as to be able to produce grooves having different orientations in the tread of the tire. These fixed fastening points 39 can comprise, for instance, means defining a series of holes provided in irons arranged parallel to the tire and/or transversely with respect to it.

The fastening device 36, which is firmly connected with the piston rod 35 of the jack, also supports a tube 60 which extends parallel to the longitudinal axis of the piston rod in the direction of the tool 1. This tube, which is located below the cylinder 30 of the jack, is traversed end-to-end by the cable 37 and serves as guide for the cylinder 30 via a bracket 61 rigidly fastened to the cylinder and provided with bore holes 62 through which the tube 60 passes. On the bracket 61 there are fastened the control box 33 and, near the latter, a handle 34 by which the operator can manipulate the tool.

The grooved roller 8 of the tool 1 is intended to be placed on the cable 37 and roll on it when the jack is actuated to displace the tool.

The assembly comprising the tool 1, the hydraulic jack 30, 32 and the cable 37 secured at 39 is supported on the one hand by the guide rollers 26 applied to the rails 27 placed on the tread and on the other hand by a cable 42 connected at one end to the jack cylinder 30 and at the other end to a balancer 40 with counterweight 41, known per se, intended to compensate for the weight of the assembly. The balancer 40, 41 is itself fastened, for instance, to a cross member (not shown) which can pivot around a vertical axis.

The tool system described above operates as illustrated in FIG. 2, which shows the tool in the process of cutting a groove such as 52 oriented in the circumferential direction of the tire and located between two transverse grooves 53 which have already been cut. The cutting blade 5 is shown substantially halfway between the two grooves 53, having thus already cut approximately half of the longitudinal groove 52 previously traced by chalk on the tread 50 of the tire 51.

Before starting to cut the groove 52, the two rails 27, fastened on a holding plate 70, made, for instance, of iron flats, are placed on the tread 50 on opposite sides and along the outline of the groove 52 to be cut. To a fastening point 39 located in the longitudinal axis of the groove 52 to be cut there has been fastened the end 38 of the traction cable 37. The cable 37 is then stretched between the selected fastening point and the fixed point 36 at the outer end of the piston rod 35. The tool is moreover suspended by the cable 42 from the balancer 40, 41, which is substantially plum with the groove 52.

The tool is then connected to a source of alternating current intended to heat the blade 5, to a source of hydraulic fluid via two flexible hoses connected to the connections 31, and to a source of cooling fluid via the hose 10.

The blade 5 is then placed in the transverse groove 53 which has already been cut and positioned precisely at the place at which the cutting of the groove 52 is to begin. In this position of the blade 5, the cylinder 30 of the jack is in end position in contact with the fastening device 36 of the cable 37. When the blade 5 has reached the stipulated operating temperature, hydraulic fluid is passed, under a pressure of, for instance, 60 bars, into the cylinder 30 of the jack through the connection 31 located at the front of the piston 32 with respect to the blade 5. As the piston 32 cannot be pushed back in the direction towards the rear end of the cylinder 30 since its rod 35 is rigidly connected with the device 36 fastened to the end of the cable 37 secured to the fixed point 39, it is therefore the cylinder 30 of the jack which, with the blade 5, moves in the direction towards the fastening point 39, pushing the blade in front of it, the blade thus cutting the groove 52 in the tread to a depth which is previously regulated by means of the threaded rods 23, the nuts 25, and the spacer 28 (FIG. 1). During this cutting, the operator need not exert any substantial force; it is sufficient to hold the handle 15 in one hand so that the cutting tool remains applied well to the rails 27 by the rollers 26, while with his other hand he can hold the handle 34 to ensure the lateral guiding of the assembly. When the blade 5 debouches in the following groove 53, the operator uses the appropriate pushbutton of the control box 33 to stop the flow of hydraulic fluid into the cylinder 30. The blade 5 is then extracted from the tread of the tire by lifting the assembly from the apparatus. Hydraulic fluid is passed into the cylinder 30 via the connection 31 located to the rear of the piston 32 with respect to the blade 5, which has the effect of bringing the cylinder 30 back against the fastening device 36 at the outer end of the piston rod 35. During these movements, the cylinder 30 is guided by the bracket 61 which slides along the tube 60.

The tool is then ready to carry out a new cutting operation. First of all, the tire 51 will possibly have been turned on its support so that the groove to be cut is in suitable position with respect to the blade 5. Moreover, if the groove to be cut does not have the same orientation as that which has just been cut, it is advisable to disengage the cable 37 from the fastening point 39 and fasten it to another fastening point located along the axis of the groove to be cut.

Thus there is provided in accordance with the invention a novel and highly-effective tool and method facilitating the rapid and economical recapping of tires of large size. Many modifications of the representative embodiment of the invention described above will readily occur to those skilled in the art upon consideration of this disclosure. For example, it is within the scope of the invention to anchor the jack cylinder 30 to the fastening device 36 and to attach the tool 1 to the piston rod 35, in order to effect displacement of the tool. Accordingly, the invention is to be construed as including all embodiments within the scope of the appended claims.

I claim:

1. A tool for cutting grooves in a tire tread, comprising a transformer having a primary and secondary, means for supplying the primary with current of low voltage at a frequency between 50 and 1,000 hertz, at least a portion of the secondary being formed as a blade having a shape corresponding to the profile of the grooves to be cut, further comprising drive means for hauling the tool to enable the blade to cut grooves in the tire tread, wherein the drive means comprises a hydraulic jack having a first part connected to and movable with the tool and a second part movable with respect to the first part, and means for anchoring the second part, whereby relative movement of the two parts displaces the tool, and wherein the means for anchoring the second part of the jack comprises a traction cable, means connecting one end of the traction cable to said second part of the jack, a fixed support having a plurality of points of attachment, and means connecting the other end of said traction cable to said fixed support at a selected one of said points of attachment, the selection of the point of attachment being variable in dependence on the desired direction of the cut.

2. A tool for cutting grooves in a tire tread comprising a transformer having a primary and a secondary, the secondary comprising a blade heatable by electric current flowing through the transformer and having a rubber-penetrating portion of a shape that corresponds to the profile of the grooves to be cut, and temperature-control means comprising two thermometer means, one of the thermometer means being mounted to measure the temperature of the rubber-penetrating portion of the blade and the other thermometer means being mounted to measure the temperature of a portion of the blade spaced apart from the rubber-penetrating portion, the first thermometer means facilitating control of the flow of electric current through the transformer, and the second thermometer means facilitating control of a cooling fluid blown on the transformer and on the tire near the blade.

3. A tool according to claim 2 in which the primary of the transformer is constructed to pass alternating current of a frequency substantially within the range of 50 hertz to 1,000 hertz.

4. A tool according to claim 2 in which the primary of the transformer is constructed to pass alternating current of a frequency substantially within the range of 200 hertz to 500 hertz.

5. A tool according to claim 2 further comprising drive means for hauling the tool to enable the blade to cut grooves in the tire tread.

6. A tool according to claim 2 wherein the blade is maintained at a cutting temperature substantially within the range of 100°C to 200°C, further comprising drive means for hauling the tool at a cutting speed substantially within the range of 0.2 meters per minute to 2 meters per minute.

7. A tool according to claim 6 wherein the drive means comprises a hydraulic jack having a first part connected to and movable with the tool and a second part movable with respect to the first part, and means for anchoring the second part, whereby relative movement of the two parts displaces the tool.

8. A tool according to claim 2 further comprising balancing means compensating for the weight of the tool.

* * * * *